United States Patent [19]  [11] 3,880,824
Rao et al.  [45] Apr. 29, 1975

[54] GLUTEN LIPID COMPLEXES AND PROCESS FOR PREPARING SAME

[75] Inventors: Ganta V. Rao; Oliver B. Gerrish, Sr., both of Hutchinson, Kans.

[73] Assignee: Far-Mar-Co., Inc., Hutchinson, Kans.

[22] Filed: July 18, 1972

[21] Appl. No.: 272,892

[52] U.S. Cl. ............. 260/112 G; 426/208; 426/364
[51] Int. Cl. ........................... A23l 1/10; A21d 2/36
[58] Field of Search ..... 99/17; 260/112 G; 426/364, 426/208

[56] References Cited
UNITED STATES PATENTS
2,928,821  3/1960  Chayen ........................... 426/364 X
3,362,829  1/1968  Landfried et al. .............. 426/212 X Primary Examiner—James R. Hoffman
Attorney, Agent, or Firm—Clarence A. O'Brien; Harvey B. Jacobson

[57] ABSTRACT

Vital wheat gluten complexes with lipids are resistant to particle cohesion when dispersed in aqueous media. Dry, finely divided vital wheat gluten is dispersed in an inert diluent and complexed by reaction with ionic and non-ionic fatty substances selected from the group consisting of fatty acid chlorides, fatty monoglycerides, lactylic esters of fatty acids, phospholipids and sorbitan fatty acid esters, in the presence of a mild base catalyst at temperatures ranging from 5°–60° C. Phospholipids and lactylic esters of fatty acids yield comparable complexes in an acid environment.

42 Claims, No Drawings

GLUTEN LIPID COMPLEXES AND PROCESS FOR PREPARING SAME

BACKGROUND OF THE INVENTION

1. Field of the Invention

The present invention relates to vital wheat gluten and more particularly to vital wheat gluten-lipid complexes, and to a process for treating gluten to render it more resistant to particle cohesion in aqueous media.

2. Description of the Prior Art

Vital wheat gluten is the complex-water insoluble fraction of wheat protein which forms a cohesive, elastic mass when hydrated. The hydrated gluten matrix with its accompanying components of starch, lipids, proteins, minerals, sugars and minor additives forms the cohesive and viscous, yet elastic, mass characterized as dough. Gluten proteins are of fundamental importance to the baking industry because of their dough-forming properties. Vital gluten, therefore, is used in the baking and food industry to fortify and strengthen weak flours for breads and pasta products as well as to increase protein content.

One of the most important properties of vital wheat gluten is its ability to hydrate rapidly with water to a cohesive, elastic mass. This same property makes it difficult to maintain a dispersion of undenatured vital wheat gluten in an essentially aqueous media as required by modern baking technology. One solution to the dispersion problem is disclosed in U.S. Pat. No. 3,362,829 wherein certain hydrophilic lipids are incorporated with or coated on the gluten particle. However, the coating of gluten with hydrophilic lipids is an exclusively physical process, i.e. no chemical reaction is involved, and therefore the dispersibility of the resulting particles depends upon the characteristics of each component thereof.

SUMMARY OF THE INVENTION

It is therefore an object of the present invention to provide a process for chemically treating gluten particles to render them resistant to cohesion in aqueous media.

It is another object of the present invention to provide a process for complexing vital wheat gluten with lipids.

It is still another object of this invention to provide gluten-lipid complexes which are resistant to particle cohesion in aqueous media.

Other objects and advantages will become apparent from the following description and appended claims.

Briefly stated, in accordance with the aforesaid objects, the present invention provides a process for complexing vital wheat gluten with lipids. Broadly, the process contemplates dispersing particulate gluten in an inert diluent and reacting the gluten with a complexing agent selected from the fatty acid chlorides, fatty monoglycerides, lactylic esters of fatty acids, sorbitan fatty acid esters and phospholipids. The reaction generally proceeds most favorably in the presence of a mild base, preferably an amine type base, catalyst; however, the phospholipids and lactylic esters prefer an acidic environment but will satisfactorily complex the gluten molecule in either a basic or acidic environment. Most preferred among the complexing agent lipids are palmitoyl chloride, sodium stearoyl 2-lactylate and phosphatidyl ethanolamine. The resulting undenatured gluten-lipid complexes, which contain from about 0.01 to 0.2 part fatty materials per part gluten are more resistant than the parent gluten to particle cohesion when dispersed in aqueous media.

DETAILED DESCRIPTION OF THE INVENTION

The process of the present invention, broadly described, comprises the steps of dispersing finely divided vital wheat gluten in an inert diluent and reacting the gluten with an ionic or non-ionic lipid selected from the fatty acid chlorides, fatty monoglycerides, lactylic esters of fatty acids, sorbitan fatty acid esters and phospholipids. A mild base catalyst is required for the reaction with most lipid complexing agents although an acid environment is preferred for complexing with the phospholipids and the lactylic esters. The reaction temperature is maintained below 60° C. at all times and preferably between about 5°–50° C. It has been found that suitable gluten-lipid complexes are formed according to the present process after about 1–5 hours, with the precise time depending primarily upon the lipid and gluten concentrations and the reaction temperature.

The gluten is initially finely divided for dispersal in an inert diluent. While the gluten size is not critical, experience has shown that gluten ground to a particle size of about 20–300 mesh is satisfactory. The diluent may be any non-aqueous, preferably organic, solvent which is non-reactive with the gluten molecule, the catalyst and the complexing agent. Most preferred among the suitable solvents are chloroform and carbon tetrachloride, although either of these in admixture with each other or with other suitable solvents, or mixtures of such other solvents, is also satisfactory. The only limitation upon the use of mixed solvents is that the solvents must be chemically non-reactive and miscible with each other.

Generally, the amount of solvent utilized to disperse the gluten is unimportant. However, it is suggested that about 1 to 10 parts by weight of solvent for each part by weight of gluten produces a satisfactory dispersion, with or without external agitation. A preferred proportion, by weight, of gluten to solvent is about 1:3.

Where the complexing agent is a fatty acid chloride, a fatty monoglyceride, a lactylic ester, a phospholipid or a sorbitan fatty acid ester, a mild base catalyst, preferably an amine type catalyst, is added to the dispersed gluten. Exemplary of the preferred catalysts are pyridine, triethylamine, methylamine, ethylamine, diethylamine, piperidine, cyclohexylamine, analinamine, ethylinediamine, and ammonium hydroxide. Use of an amine type catalyst has been found to preserve the vitality of the gluten after complexing. Non-amine type catalyst which have been tried but which have been found to devitalize the gluten include sodium hydroxide, potassium hydroxide, sodium carbonate, sodium bicarbonate, calcium carbonate and magnesium oxide. The mild base catalyst is preferably liquid to assure complete miscibility with the reaction system. It has been found that the catalyst concentration should be about 1- 20% by weight of the solvent present, or about 0.01–2 parts by weight catalyst for each part by weight of gluten, to enhance the forward complexing reaction. Preferably, the catalyst is present in a gluten-to-catalyst ratio, by weight, of 1:0.3.

Where the complexing agent is a phospholipid or a lactylic ester, it is preferred that no base catalyst be employed. Rather, the pH of the dispersed gluten is most desirably adjusted to about 6.0–6.5 by dropwise addition, as necessary, of an appropriate acid, such as concentrated sulfuric acid. Experimental testing of the gluten-phospholipid and gluten-lactylic ester complexing reaction system has shown that effective complexing can be achieved in the pH range from about 4.0–11.0. However, it has been found that as the pH of the reaction system moves farther from the preferred 6.0–6.5 pH range, secondary reactions are encouraged until, at the extremes of the range, the secondary reactions dominate. Thus, although mild base catalysis of phospholipid and lactylic ester complexing is satisfactory, it is preferable to complex gluten with these agents in an acid environment.

The complexing agents are preferably diluted with an inert diluent before being added to the dispersed gluten. The diluent is preferably the same diluent used to disperse the gluten but may be any other suitable diluent miscible therewith. The diluted complexing agent is then added dropwise over a period of time to the dispersed gluten. It is imperative that the rate of addition be sufficiently slow that the temperature of the gluten remains below its denaturing temperature, about 60°C. Denuatured gluten is not useful in the baking and food industry. If necessary, the gluten containing flask to which the complexing agent is added may be cooled to maintain the gluten temperature below 60°C. It will be appreciated that it is not necessary to dilute the complexing agent before addition to the gluten. However, such dilution has been found to improve distribution of the agent in the dispersed gluten and is therefore recommended.

Following complexing agent addition, the gluten complexing reaction mixture is set aside to stand for awhile to permit the reaction to go to completion. Gentle stirring of the mixture during this period is desirable. The time requires for the reaction to go to completion varies widely but is generally in the range of 1–5 hours. Experience has shown that for reaction systems having the preferred proportions of reactants, diluent and catalyst described herein, the complexing agent may be advantageously added over a period of about 30 minutes and the reaction is substantially completed within about two hours thereafter, for a total reaction time of about 2.5 hours.

The complexing agents of the present invention include lipids selected from the fatty acid chlorides, fatty monoglycerides, lactylic esters of fatty acids, sorbitan fatty acid esters and phospholipids. It has been found that virtually all of the agent added to the gluten participates in the reaction and complexes with the gluten. Thus, the extent of complexing is directly proportional, on a one-to-one basis, to the concentration of the complexing agent. The most desirable gluten product is obtained at a level of about 5% complexing, although satisfactory products result from as little as 1% and as much as 20% complexing. It therefore is desirable to limit the complexing agent concentration to about 1–20% by weight of the gluten present, or 0.01–0.2 part by weight complexing agent for each part by weight gluten. Excess liquid incorporated into the gluten molecule results in an end product which varies from soft to runny to slimy to non-cohesive. Insufficient lipid incorporation results in a tough, rubbery end product.

The fatty acid chlorides useful in the present process have the general formula R — COCl wherein R represents a fatty chain containing from 7 to 22 carbon atoms. While both saturated and olefinic fatty chains will complex the gluten molecule, unsaturated fatty acid chlorides have been found to contribute to rancidity. Therefore, saturated acid chlorides represent the preferred acid chloride complexing agents. Preferably R is a saturated alkyl radical having from 14 to 22 carbon atoms, and most desirably from 16 to 18 carbon atoms. Exemplary fatty acid chlorides include palmitoyl chloride, stearoyl chloride, caprylyl chloride, lauroyl chloride, myristyl chloride, oleoly chloride, linoleoyl chloride and linolenoyl chloride. Palmitoyl chloride is the particularly preferred fatty acid chloride complexing agent. It is believed that the gluten molecule (hereinafter designated as "Protein-$NH_2$") reacts with the acid chloride to form a bond involving the unused electron pair on nitrogen, which, after loss of a proton and elimination of a chloride, becomes a protein-lipid complex having the general formula Protein—N-H—CO—R.

The fatty monoglycerides suitable for use as complexing agents in the present process are typified by the formula $RCOO—CH_2—CHOH—CH_2OH$ wherein R is a fatty chain as hereinbefore described. Most preferred among the monoglycerides are stearoyl, palmitoyl, and the succinylated monoglycerides. Exemplary of other suitable monoglycerides, but which are not preferred because they are not readily available, are lauroyl, myristyl, oleyl, linoleoyl and linolenoyl monoglycerides. It is thought that the protein-lipid complex is formed by an ester interchange between the gluten molecule and the monoglycerides.

The sorbitan fatty acid esters useful in the present process generally include the sorbitan monoesters and the polyoxyethylene sorbitan mono-, di-, and tri-esters, which esters include fatty acid constituents corresponding to the fatty acid chains hereinbefore described. The sorbitan monoesters include but are not limited to sorbitan monostearate, sorbitan monolaurate, sorbitan monooleate, sorbitan monopalmitate, sorbitan monolinoleate, sorbitan monolinoleanate, sorbitan monomyristate and sorbitan monocaprylate. Exemplary of the polyoxyethylene sorbitan mono-, di-, and tri-esters are polyoxyethylene sorbitan monostearate, polyoxyethylene sorbitan-monoleate, polyoxyethylene sorbitan-monolinoleate, polyoxyethylene sorbitan-monolinolenate, polyoxyethylene sorbitan-monopalmitate, polyoxyethylene sorbitan-monolaurate, polyoxyethylene sorbitan-monocaprylate, polyoxyethylene sorbitan distearate, polyoxyethylene sorbitum-dioleate, polyoxyethylene sorbitan-dilinoleate, polyoxyethylene sorbitan-dilinolenate, polyoxyethylene sorbitan-dipalmitate, polyoxyethylene sorbitan-dilaurate, polyoxyethylene sorbitan-dicaprylate, polyoxyethylene sorbitan-tristearate, polyoxyethylene sorbitan-trioleate, polyoxyethylene sorbitan-trilinoleate, polyoxyethylene sorbitan-trilinolenate, polyoxyethylene sorbitan-tripalmitate, polyoxyethylene sorbitan-trilaurate, and polyoxyethylene sorbitan-tricaprylate. Like the fatty monoglycerides, the sorbitan fatty esters are believed to complex with the gluten by an ester interchange reaction.

Lactylic esters of fatty acids, wherein the fatty component thereof corresponds to the fatty chains hereinbefore described, are another class of suitable complexing agents. Most preferred in this class is sodium-stearoyl 2-lactylate. Examples of other suitable esters which are commercially available include calcium-stearoyl 2-lactylate, sodium stearoyl fumarate and lactylic stearate. It is noteworthy that this class of complexing agents does not require mild base catalysis, and, indeed, proceeds to form a satisfactory complex in an acid environment. However, the reaction will satisfactorily go forward in a mildly basic environment as well. It is believed that the complexing reaction between gluten and lactylic esters of fatty acids is enhanced in a mildly acidic environment (pH about 6.0) wherein the gluten reacts with an aldehyde or ketone to form an intermediate, which then undergoes dehydration to form a Schiff base. For example, the reaction with a ketone results in the formation of an imine type Schiff base having the general formula

$$>C = N - \text{Protein.}$$

The most desirable phospholipid for use as a complexing agent herein is phosphatidyl ethanolamine (cephalin). However, other useful phospholipids include phosphatadyl ethanolimine (plasmalogen), phosphatidyl choline (lecithin), phosphotidic acid, phosphatidyl serine, phosphatidyl glycerol, phosphatidyl inositol, diphosphoinositol, sphingomylin and cardiolipins. These agents prefer an acidic pH, preferably about 6.0–6.5, to complex with the gluten molecule. In the acid environment the lipid and the protein are thought to form a salt-like bond between the $NH_2$ of the phospholipid and the carbonyl moieties of the gluten. As with the previously discussed complexing agents, the fatty constituent of the lipid corresponds to the fatty chains hereinbefore described.

As illustrative and demonstrative of the present process, representative complexing agents were reacted with gluten according to the following examples.

EXAMPLE 1

Fifty grams of dry gluten (less than 5% moisture) was dispersed in 150 g. of chloroform and 20 g. of pyridine in a three necked reaction flask equipped with a water jacketed condenser, dropping funnel and a mercury or glycerin sealed motor-driven glass stirring rod fitted with teflon blades.

Five grams of palmitoyl chloride was dissolved in 25 g. of chloroform in a dropping funnel and subsequently added drop by drop with continuous stirring over a period of 30 min. Prior to and during the addition the flask was cooled to and maintained at a temperature of 10°C. Following addition of the acid chloride the temperature was raised to room temperature and stirring was continued for 2 hr.

After the reaction was completed the solvent was recovered in a rotary evaporator at room temperature. The recovered solvent can be reused for a subsequent reaction. The dried product had light color. The fat content of the starting gluten molecule and the gluten-fatty acid chloride complex was determined by the acid hydrolysis method.

Analysis:

| | |
|---|---|
| Gluten (starting) fat | 5.41% |
| Gluten complex fat | 14.62% |

EXAMPLE 2

The same general method detailed in Example 1 was used. The reaction system consisted of gluten — 50 g., chloroform — 200 g., pyridine — 30 g. and palmitoyl chloride — 8 g. Acid hydrolysis fat determination had the following result:

Analysis:

| | |
|---|---|
| Gluten (starting) fat | 5.41% |
| Gluten complex fat | 21.4% |

EXAMPLE 3

The same general method detailed in Example 1 was used. The reaction system consisted of gluten — 50 g., chloroform — 175 g., pyridine — 15 g. and palmitoyl chloride — 2 g. Acid hydrolysis fat determination had the following result:

Analysis:

| | |
|---|---|
| Gluten (starting) fat | 5.41% |
| Gluten complex fat | 10.12% |

EXAMPLE 4

The same general method detailed in Example 1 was used. The reaction system consisted of gluten — 50 g., chloroform — 150 g., pyridine — 20 g. and stearoyl chloride — 5 g. Acid hydrolysis fat determination had the following result:

Analysis:

| | |
|---|---|
| Gluten (starting) fat | 5.41% |
| Gluten complex fat | 15.02% |

EXAMPLE 5

The same general method detailed in Example 1 was used. The reaction system consisted of gluten — 25 g., chloroform — 70 g., pyridine — 15 g. and stearoyl chloride — 1 g. Acid hydrolysis fat determination had the following result:

Analysis:

| | |
|---|---|
| Gluten (starting) fat | 5.41% |
| Gluten complex fat | 9.89% |

EXAMPLE 6

Fifty grams of dry gluten (less than 5% moisture) was dispersed in 150 g. of chloroform and a drop of concentrated sulphuric acid was added to adjust the pH to 6.0 in a three necked reaction flask equipped with a water jacketed condenser, dropping funnel and a mercury or glycerin sealed motor driven glass stirring rod fitted with teflon blades.

Five grams of sodium stearoyl 2-lactylate was dissolved in 20 g. of chloroform in a dropping funnel and slowly added to the reaction mixture, stirring was continued for 3 hours at room temperature.

After the reaction was completed the solvent was recovered in a rotary evaporator at room temperature. The recovered solvent can be reused for a subsequent reaction. The dried product had light color. The fat content of the starting gluten molecule and the gluten-lactylate complex was determined by the acid hydrolysis method.

Analysis:

Gluten (starting) fat    5.41%
Gluten Complex fat    13.92%

EXAMPLE 7

The same general method detailed in Example 6 was used. The reaction system consisted of gluten — 50 g., chloroform — 100 g. and sodium stearoyl 2-lactylate — 2 g. Acid hydrolysis fat determination had the following result:
Analysis:

Gluten (starting) fat    5.41%
Gluten complex fat    9.42%

EXAMPLE 8

The same general method detailed in Example 6 was used. The reaction system consisted of gluten — 50 g., chloroform — 125 g. and sodium stearoyl 2-lactylate — 1 g. Acid hydrolysis fat determination had the following result:
Analysis:

Gluten (starting) fat    5.41%
Gluten complex fat    7.17%

EXAMPLE 9

The same general method detailed in Example 6 was used. The reaction system consisted of gluten — 50 g., chloroform — 175 g. and sodium stearoyl 2-lactylate — 10 g. Acid hydrolysis fat determination had the following result:
Analysis:

Gluten (starting) fat    5.41%
Gluten complex fat    22.74%

EXAMPLE 10

Fifty grams of dry gluten (less than 5% moisture) was dispersed in 200 g. of ammonical solution at pH 11.00 in a three-necked reaction flask. 7 g. of sodium stearoyl 2-lactylate was dissolved in 25 g. of ammonical solution at pH 11.00 and added to the reaction flask. After addition stirring was continued for 3 hours at room temperature.

After the reaction was completed, the product was frozen and freeze-dried at room temperature. The dried product had light color. The fat content of the starting gluten molecule and the gluten-lactylate complex was determined by the acid hydrolysis method.
Analysis:

Gluten (starting) fat    5.41%
Gluten complex fat    12.74%

EXAMPLE 11

Fifty grams of dry gluten (less than 5% moisture) was dispersed in 150 g. of chloroform and a drop of concentrated sulphuric acid added to adjust the pH to 6.0 in a three necked reaction flask equipped with a water jacketed condenser, dropping funnel and a mercury or glycerin sealed motor driven glass rod fitted with teflon blades.

Two grams of hydrogenated phosphatidyl ethanolamine (source egg yolk) was dissolved in 20 g. of chloroform in a dropping funnel and added to the reaction mixture at room temperature and the reaction continued with stirring for 3 hrs.

After the reaction was completed the solvent was recovered in a rotary evaporator at room temperature. The recovered solvent can be reused for a subsequent reaction. The dried product was light in color. The fat content of the starting gluten molecule and the gluten-phospholipid complex was determined by the acid hydrolysis method.
Analysis:

Gluten (starting) fat    5.41%
Gluten complex fat    9.25%

EXAMPLE 12

The same general method detailed in Example 11 was used. The reaction system consisted of gluten — 50 g., chloroform — 125 g. and phosphatidyl ethanolamine (egg) — 2 g. Acid hydrolysis fat determination had the following result:
Analysis:

Gluten (starting) fat    5.41%
Gluten complex fat    8.17%

EXAMPLE 13

Fifty grams of dry gluten (less than 5% moisture) was dispersed in 150 g. of chloroform and 20 g. of pyridine in a three necked reaction flask equipped with water jacketed condenser, dropping funnel and a mercury or glycerin sealed motor driven glass stirring rod fitted with teflon blades.

Five grams of stearoyl monoglyceride was dissolved in 25 g. of chloroform in a dropping funnel and subsequently added slowly to the reaction flask at room temperature. Reaction was continued with stirring at room temperature for 3 hours.

After the reaction was completed the solvent was recovered in a rotary evaporator at room temperature. The recovered solvent can be reused for a subsequent reaction. The dried product had light color. The fat content of the starting gluten molecule and the gluten-monoglyceride complex was determined by the acid hydrolysis method.
Analysis:

Gluten (starting) fat    5.41%
Gluten complex fat    14.92%

EXAMPLE 14

The same general method detailed in Example 13 was used. The reaction system consisted of gluten — 50 g., chloroform — 125 g., pyridine — 20 g. and stearoyl monoglyceride — 7 g. Acid hydrolysis fat determination had the following result:
Analysis:

| | |
|---|---|
| Gluten (starting) fat | 5.41% |
| Gluten complex fat | 22.72% |

EXAMPLE 15

The same general method detailed in Example 13 was used. The reaction system consisted of gluten — 50 g., chloroform — 100 g., pyridine — 15 g. and stearoyl monoglyceride — 2 g. Acid hydrolysis fat determination had the following result:

Analysis:

| | |
|---|---|
| Gluten (starting) fat | 5.41% |
| Gluten complex fat | 8.94% |

EXAMPLE 16

Fifty grams of dry gluten (less than 5% moisture) was dispersed in 150 g. of chloroform and 25 g. of pyridine in three necked flask equipped with water jacketed condenser, dropping funnel and a mercury or glycerin sealed motor driven glass stirring rod with teflon blades.

Five grams of sorbitan monostearate was dissolved in 20 g. of chloroform in a dropping funnel and subsequently added slowly to the reaction flask at room temperature. Reaction was continued with stirring at room temperature for 3 hours.

After the reaction was completed the solvent was recovered in a rotary evaporator at room temperature. The recovered solvent can be reused for a subsequent reaction. The dried product had light color. The fat content of the starting gluten molecule and the gluten-sorbitan monostearate complex was determined by the acid hydrolysis method.

Analysis:

| | |
|---|---|
| Gluten (starting) fat | 5.41% |
| Gluten complex fat | 15.42% |

EXAMPLE 17

The same general method detailed in Example 16 was used. The reaction system consisted of gluten — 50 g., chloroform — 125 g., pyridine — 20 g. and sorbitan monostearate — 7 g. Acid hydrolysis fat determination had the following result:

Analysis:

| | |
|---|---|
| Gluten (starting) fat | 5.41% |
| Gluten complex fat | 21.42% |

EXAMPLE 18

The same general method detailed in Example 16 was used. The reaction system consisted of gluten — 50 g., chloroform — 100 g., pyridine — 15 g. and sorbitan monostearate — 2 g. Acid hydrolysis fat determination had the following result:

Analysis:

| | |
|---|---|
| Gluten (starting) fat | 5.41% |
| Gluten complex fat | 9.22% |

The complexes formed by the reactions of the present process were tested for dispersibility in neutral aqueous media and found to be readily dispersible. The test procedure involved adding 10 g. of each of the reaction products of Examples 1–18 and a like amount of a control starting material, dry gluten, to 250 g. of distilled water, at room temperature in 1 liter beakers. The complexed gluten product and starting material gluten were each added slowly to the beakers with vigorous manual agitation. Stirring was continued for 2 minutes. Dispersibility was evaluated after a 5 minute rest period on a subjective scale ranging from good to unacceptable. Results are presented in the following table:

Dispersibility in Distilled Water

| Product | Dispersibility |
|---|---|
| Dry vital gluten | Unacceptable (lumps) |
| Complex formed from palmitoyl chloride and vital gluten | Good |
| Complex formed from stearoyl 2-lactylate and vital gluten | Good |
| Complex formed from phosphatidyl ethanolamine and vital gluten | Good |
| Complex formed from stearoyl monoglyceride and vital gluten | Good |
| Complex formed from sorbitan monostearate and vital gluten | Good |

In addition, baking tests were conducted on dough made from vital wheat gluten-lipid complexes. In all cases the resulting baked product was satisfactory in every respect, confirming the functionality of the complexes.

While the present invention has been described with respect to particular embodiments thereof, it will be understood that numerous modifications may be made by those skilled in the art without actually departing from the scope of the invention.

What is claimed as new is as follows:

1. A process for preparing vital wheat gluten-lipid complexes comprising the steps of:
   a. dispersing finely divided vital wheat gluten in a non-aqueous diluent, said diluent comprising an organic solvent non-reactive with said gluten and the lipid complexing system of (b), and
   b. reacting said dispersed gluten at a temperature below the temperature at which gluten denatures with a lipid complexing system selected from the group consisting of
      1. fatty acid chlorides and a mild base catalyst which will not denature said gluten,
      2. fatty monoglycerides and a mild base catalyst which will not denature said gluten, 3. sorbitan fatty acid esters and a mild base catalyst which will not denature said gluten,
4. lactylic esters of fatty acids and a mild base catalyst which will not denature said gluten,
5. phospholipids and a mild base catalyst which will not denature said gluten,
6. lactylic esters of fatty acids in a pH 4 to less than 7 environment, and
7. phospholipids in a pH 4 to less than 7 environment.

2. A process, as claimed in claim 1, wherein said dispersed gluten is reacted, in a complexing system including a mild base catalyst, with a lipid selected from the group consisting of fatty acid chlorides, fatty monoglycerides, lactylic esters of fatty acids, phospholipids and sorbitan fatty acid esters.

3. A process, as claimed in claim 2, wherein said lipid is selected from the group consisting of fatty acid chlorides, fatty monoglycerides and sorbitan fatty acid esters.

4. A process, as claimed in claim 2, wherein said mild base catalyst is an amine type catalyst.

5. A process as claimed in claim 4, wherein said amine type catalyst is pyridine.

6. A process, as claimed in claim 2, wherein said finely divided gluten has a particle size in the range of from 20 to 300 mesh, said reaction is carried out at a temperature in the range from about 5°–60°C., said mild base catalyst is an amine type catalyst, said fatty acid chlorides are selected from the group consisting of palmitoyl chloride and stearoyl chloride, said fatty monoglycerides are selected from the group consisting of stearoyl monoglyceride and palmitoyl monoglyceride, said sorbitan fatty acid esters are selected from the group consisting of sorbitan monostearate, polyoxyethylene sorbitan monostearate, polyoxyethylene sorbitan distearate and polyoxyethylene sorbitan tristearate, said lactylic esters are selected from the group consisting of sodium-stearoyl 2-lactylate, calcium-stearoyl 2-lactylate, sodium-stearoyl fumarate and lactylic stearate and said phospholipids comprise phosphatidyl ethanolamine.

7. A process, as claimed in claim 1, wherein said dispersed gluten is reacted in a pH 4 to less than 7 environment with a lipid selected from the group consisting of lactylic esters of fatty acids and phospholipids.

8. A process, as claimed in claim 7, wherein said finely divided gluten has a particle size in the range of from 20 to 300 mesh, said reaction is carried out at a temperature in the range from about 5°–60°C., said lactylic esters are selected from the group consisting of sodium-stearoyl 2-lactylate, calcium-stearoyl 2-lactylate, sodium-stearoyl fumarate and lactylic stearate and said phospholipids comprise phosphatidyl ethanolamine.

9. A process, as claimed in claim 1, wherein said finely divided gluten has a particle size in the range of from 20 to 300 mesh.

10. A process as claimed in claim 1, wherein said reaction is carried out at a temperature in the range from about 5°–60° C.

11. A process, as claimed in claim 1, wherein said diluent is selected from the group consisting of chloroform, carbon tetrachloride and mixtures thereof.

12. A process, as claimed in claim 1, wherein said lipid is diluted with a non-aqueous diluent comprising an organic solvent nonreactive with said gluten and said lipid complexing system prior to reacting said lipid with said gluten.

13. A process, as claimed in claim 12, wherein said diluted lipid is reacted with said dispersed gluten by adding said lipid thereto at a sufficiently slow rate that the gluten temperature is always less than 60° C.

14. A process, as claimed in claim 1, wherein the fatty component of said lipid comprises a saturated alkyl chain containing from 7–22 carbon atoms.

15. A process, as claimed in claim 14, wherein said chain contains from 14–22 carbon atoms.

16. A process, as claimed in claim 15, wherein said chain contains from 16–18 carbon atoms.

17. A process, as claimed in claim 1, wherein said fatty acid chlorides are selected from the group consisting of palmitoyl chloride and stearoyl chloride.

18. A process, as claimed in claim 1, wherein said fatty monoglycerides are selected from the group consisting of stearoyl monoglyceride and palmitoyl monoglyceride.

19. A process, as claimed in claim 1, wherein said sorbitan fatty acid esters are selected from the group consisting of sorbitan monostearate, polyoxyethylene sorbitan monostearate, polyoxyethylene sorbitan distearate and polyoxyethylene sorbitan tristearate.

20. A process as claimed in claim 1, wherein said lactic esters are selected from the group consisting of sodium-stearoyl 2-lactylate, calcium-stearoyl 2-lactylate, sodium-stearoyl fumarate and lactylic stearate.

21. A process, as claimed in claim 1, wherein said phospholipid is phosphatidyl ethanolamine.

22. A process, as claimed in claim 1, wherein the reaction system comprises, in parts by weight of each component per part of gluten present, about 1–10 parts diluent, about 0.01–2 parts catalyst and 0.01–0.2 part lipid.

23. A process, as claimed in claim 22, wherein said reaction system comprises about 3 parts diluent, about 0.3 part catalyst and about 0.05 part lipid.

24. A process, as claimed in claim 22, wherein said gluten has a particle size of from 20–300 mesh, said diluent is selected from the group consisting of carbon tetrachloride and chloroform, said base catalyst is an amine type catalyst, said lipid is an acid chloride selected from the group consisting of palmitoyl chloride and stearoyl chloride, and said complexing reaction is carried out at a temperature in the range from about 5°–60° C.

25. A process, as claimed in claim 22, wherein said gluten has a particle size of from 20–300 mesh, said diluent is selected from the group consisting of carbon tetrachloride and chloroform, said base catalyst is an amine type catalyst, said lipid is a fatty monoglyceride selected from the group consisting of stearoyl monoglyceride and palmitoyl monoglyceride, and said complexing reaction is carried out at a temperature in the range from about 5°–60° C.

26. A process, as claimed in claim 22, wherein said gluten has a particle size of from 20–300 mesh, said diluent is selected from the group consisting of carbon tetrachloride and chloroform, said base catalyst is an amine type catalyst, said lipid is a sorbitan fatty acid ester selected from the group consisting of sorbitan monostearate, polyoxyethylene sorbitan monostearate, polyoxyethylene sorbitan distearate and polyoxyethylene sorbitan tristearate, and said complexing reaction is carried out at a temperature in the range from about 5°–60° C.

27. A process, as claimed in claim 22, wherein said gluten has a particle size of from 20–300 mesh, said diluent is selected from the group consisting of carbon tetrachloride and chloroform, said base catalyst is an amine type catalyst, said lipid is a lactylic ester selected from the group consisting of sodium-stearoyl 2-lactylate, calcium-stearoyl 2-lactylate, sodium stearoyl fumarate and lactylic stearate, and said complexing reaction is carried out at a temperature in the range from about 5°–60° C.

28. A process, as claimed in claim 22, wherein said gluten has a particle size of from 20–300 mesh, said diluent is selected from the group consisting of carbon tetrachloride and chloroform, said lipid is a lactylic ester selected from the group consisting of sodium-stearoyl 2-lactylate, calcium-stearoyl 2-lactylate, sodium stearoyl fumarate and lactylic stearate, and said complexing reaction is carried out at a pH of 6.0–6.5 and a temperature in the range from about 5°–60° C.

29. A process, as claimed in claim 22, wherein said gluten has a particle size of from 20–300 mesh, said diluent is selected from the group consisting of carbon tetrachloride and chloroform, said lipid is phosphatidyl ethanolamine, and said complexing reaction is carried out at a pH of 6.0–6.5 and a temperature in the range from about 5°–60° C.

30. A process, as claimed in claim 1, wherein said acidic environment has a pH in the range of 6.0–6.5.

31. A proteinaceous composition comprising a finely divided vital wheat gluten-lipid complex which is readily dispersible in aqueous media, said complex comprising the reaction product, at a temperature below the temperature at which gluten denatures and in a pH 4 to mildly basic environment which will not denature said gluten, of dispersed vital wheat gluten and a lipid selected from the group consisting of fatty acid chlorides, fatty monoglycerides, sorbitan fatty acid esters, lactylic esters of fatty acids and phospholipids.

32. A composition, as claimed in claim 31, wherein the fatty component of said lipid comprises a saturated alkyl chain containing from 14–22 carbon atoms.

33. A composition, as claimed in claim 31, wherein said complex includes about 0.01–0.2 part by weight lipid per part of gluten.

34. A composition, as claimed in claim 33, wherein said complex include about 0.05 part by weight lipid per part of gluten.

35. A composition, as claimed in claim 33, wherein said fatty acid chlorides are selected from the group consisting of palmitoyl chloride and stearoyl chloride.

36. A composition, as claimed in claim 33, wherein said fatty monglycerides are selected from the group consisting of stearoyl monoglyceride and palmitoyl monoglyceride.

37. A composition, as claimed in claim 33, wherein said sorbitan fatty acid esters are selected from the group consisting of sorbitan monostearate, polyoxyethylene sorbitan monostearate, polyoxyethylene sorbitan distearate and polyoxyethylene sorbitan tristearate.

38. A composition, as claimed in claim 33, wherein said lactylic esters are selected from the group consisting of sodium-stearoyl 2-lactylate, calcium-stearoyl 2-lactylate, sodium-stearoyl fumarate and lactylic stearate.

39. A composition, as claimed in claim 33, wherein said phospholipid is phosphatidyl ethanolamine.

40. A composition, as claimed in claim 33, wherein said finely divided gluten has a particle size in the range of from 20–300 mesh.

41. A proteinaceous composition, as claimed in claim 31, wherein said mild base environment is provided by a mild base catalyst which will not denature said gluten.

42. A proteinaceous composition, as claimed in claim 31, wherein said lipid is selected from the group consisting of lactylic esters of fatty acids and phospholipids and said lipid is reacted with said dispersed vital wheat gluten in a pH 4 to less than 7 environment.

* * * * *